R. KENT.
Warehouse-Truck.
No. 199,372. Patented Jan. 22, 1878.
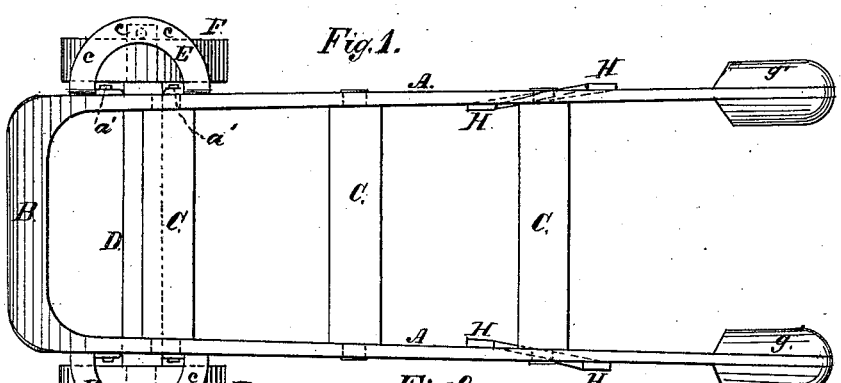
Fig. 1.
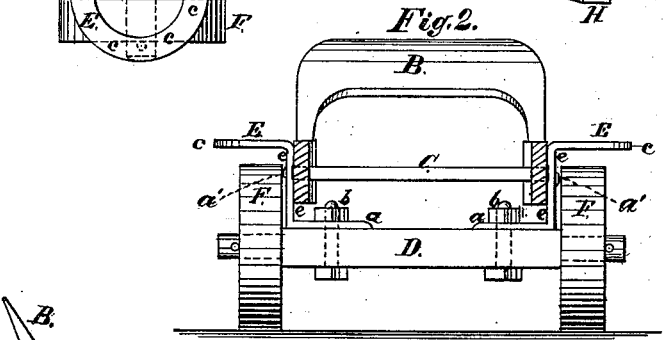
Fig. 2.
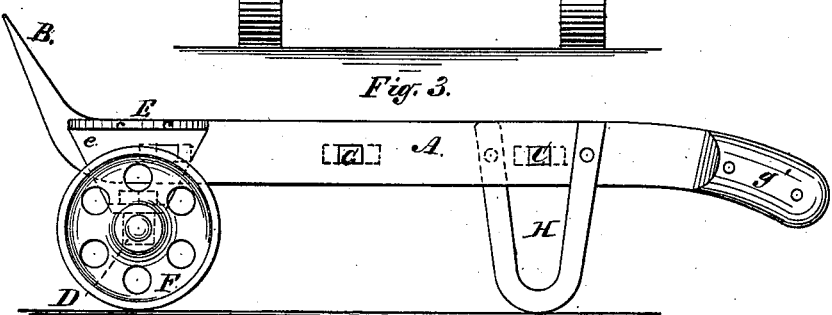
Fig. 3.
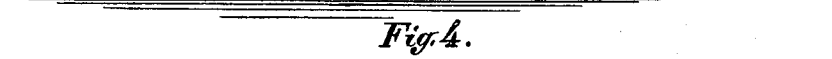
Fig. 4.
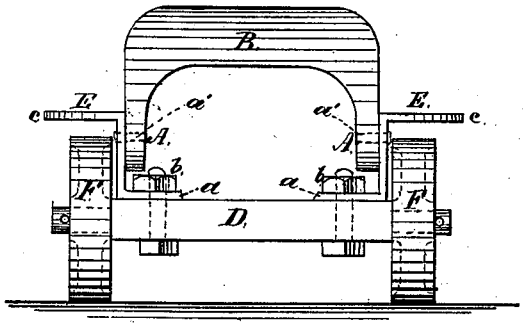
Witnesses:
Henry Eichling
H Wells Jr
Inventor:
Robert Kent
per James A Whitney
Atty

UNITED STATES PATENT OFFICE.

ROBERT KENT, OF BROOKLYN, NEW YORK.

IMPROVEMENT IN WAREHOUSE-TRUCKS.

Specification forming part of Letters Patent No. 199,372, dated January 22, 1878; application filed December 18, 1877.

*To all whom it may concern:*

Be it known that I, ROBERT KENT, of Brooklyn, in the county of Kings and State of New York, have invented certain Improvements in Warehouse-Trucks, of which the following is a specification:

The object of this invention is to provide a metallic warehouse-truck of more simple, strong, and durable construction, capable of more convenient use, and less liable to get out of order than those hitherto devised.

Figure 1 is a plan view of a truck made according to my invention; Fig. 2, a transverse sectional view of the same; Fig. 3, a side view, and Fig. 4 an end view taken from a stand-point opposite that of Fig. 2.

The side bars A and upturned front B, which, in conjunction with the cross-bars hereinafter mentioned, form the frame of the truck, instead of being made of separate pieces, bolted, riveted, or otherwise united together, as is the ordinary practice, are all made in one piece of wrought-iron, the sides A being narrow in their thickness, but of considerable depth, as shown more fully in Fig. 2. The cross-bars C are also of iron, with shouldered ends, passed through suitable sockets provided in the side pieces, and riveted or headed over at their outer extremities, thereby firmly joining the cross-bars with the side pieces, to constitute the frame of the truck.

D is the axle, made of squared iron. E E are peculiarly-shaped bracket-guards, as they may be termed, which are placed one near each end of the axle, but at the inner side of the adjacent wheel F, the wheels F being placed upon the axle in the usual manner.

The lower horizontal portion $a$ of each bracket-guard E is firmly secured upon the axle D by a bolt and nut, $b$. The vertical or central portion $e$ of each bracket-guard has bolted or riveted to it, as shown at $a'$, the end portion of the adjacent side piece A, thereby serving to attach said side piece to the axle. The upper horizontal portion $c$ of each bracket-guard is extended over and above the adjacent wheel, as indicated more fully in Fig. 1.

It will be seen that these bracket-guards serve the double purpose of attaching the side pieces A (and consequently the frame of the truck) to the axle D, and also providing guards or protectors above the wheels, which prevent boxes, packages, or other articles from striking the wheels during the rough usage to which the truck is subjected in actual practice.

The handles $g'$ are provided upon the rearmost extremities of the side pieces A, and need no description.

H indicates the legs or supports, occupying the usual position with reference to the frame of the truck, but themselves of peculiar construction, and provided in a peculiar manner, each of the said legs or supports being made of a single piece of wrought-iron, bent into V or U shape, as more plainly shown in Fig. 3, one of its extremities being riveted fast upon the outer surface of the side piece A, to which it is attached, and the other extremity being riveted in like manner to the inner surface of said side piece, so that while the V or U shape gives strength against strain exerted in a direction longitudinal with the truck, the spreading of the two extremities aforesaid in lateral direction tends to resist strain exerted transversely.

I claim as my invention—

1. In a warehouse-truck, the combination of the bracket-guards E, the frame, comprising the side pieces A and end B, made of a single piece of wrought-iron, and the axle D, the whole constructed and arranged substantially as and for the purpose herein set forth.

2. In a warehouse-truck, the V or U shaped legs H, made of a single piece of metal, and with their extremities attached upon opposite sides of the side pieces A, substantially as and for the purpose herein set forth.

ROBERT KENT.

Witnesses:
EDWARD HOLLY,
H. WELLS, Jr.